(12) United States Patent
Hoghoj et al.

(10) Patent No.: US 12,716,855 B2
(45) Date of Patent: Aug. 25, 2026

(54) X-RAY SCATTERING APPARATUS AND X-RAY SCATTERING METHOD

(71) Applicant: XENOCS SAS, Grenoble (FR)

(72) Inventors: Peter Hoghoj, Grenoble (FR); Karsten Joensen, Grenoble (FR); Pierre Panine, Grenoble (FR)

(73) Assignee: XENOCS SAS, Grenoble (FR)

( * ) Notice: Subject to any disclaimer, the term of this patent is extended or adjusted under 35 U.S.C. 154(b) by 154 days.

(21) Appl. No.: 18/562,508

(22) PCT Filed: May 24, 2022

(86) PCT No.: PCT/EP2022/064053
§ 371 (c)(1),
(2) Date: Nov. 20, 2023

(87) PCT Pub. No.: WO2022/248471
PCT Pub. Date: Dec. 1, 2022

(65) Prior Publication Data

US 2024/0248050 A1 Jul. 25, 2024

(30) Foreign Application Priority Data

May 25, 2021 (EP) .................................... 21315088

(51) Int. Cl.
*G01N 23/201* (2018.01)
*G01N 23/20008* (2018.01)
*G01N 23/2055* (2018.01)

(52) U.S. Cl.
CPC ..... *G01N 23/201* (2013.01); *G01N 23/20008* (2013.01); *G01N 23/2055* (2013.01);
(Continued)

(58) Field of Classification Search
None
See application file for complete search history.

(56) References Cited

U.S. PATENT DOCUMENTS 4,247,771 A * 1/1981 Frevel .................. G01N 23/207 378/80
7,035,373 B2 * 4/2006 Omote ..................... G21K 1/06 378/81
(Continued)

FOREIGN PATENT DOCUMENTS

JP 3271426 B2 * 4/2002
JP 2024102019 A * 7/2024

OTHER PUBLICATIONS

International Search Report and Written Opinion for PCT Application No. PCT/EP2022/064053, mailed Jul. 12, 2022.
(Continued)

*Primary Examiner* — Thomas R Artman
(74) *Attorney, Agent, or Firm* — Notaro, Michalos & Zaccaria P.C.

(57) ABSTRACT

An X-ray scattering apparatus has a sample vacuum chamber, a sample holder placed inside the sample vacuum chamber for aligning and/or orienting a sample to be analyzed by X-ray scattering, an X-ray beam delivery system having a 2D X-ray source and a 2D monochromator and being arranged upstream of the sample holder for generating and directing an X-ray beam along a beam path in a propagation direction towards the sample holder. An X-ray detector placed inside a diffraction chamber connected to the sample vacuum chamber where the X-ray detector is arranged downstream of the sample holder and is movable, in a motorized way, along the propagation direction so as to detect the X-ray beam and X-rays scattered at different scattering angles, where the X-ray beam delivery system is configured to focus the X-ray beam onto a focal spot on or near the X-ray detector when placed at its distal position.

19 Claims, 7 Drawing Sheets

(52) U.S. Cl.
CPC .................. *G01N 2223/054* (2013.01); *G01N 2223/0566* (2013.01); *G01N 2223/315* (2013.01); *G01N 2223/32* (2013.01); *G01N 2223/321* (2013.01); *G01N 2223/33* (2013.01)

(56) References Cited

U.S. PATENT DOCUMENTS

| | | | | |
|---|---|---|---|---|
| 9,994,658 | B2 * | 6/2018 | Atienza | C08F 210/16 |
| 10,429,326 | B2 * | 10/2019 | Hoffman | G21K 1/06 |
| 11,029,265 | B2 * | 6/2021 | Hoghoj | G01N 23/201 |
| 11,275,038 | B2 * | 3/2022 | Hoghoj | G01N 23/2055 |
| 11,307,155 | B2 * | 4/2022 | Gehrlein | G01N 23/201 |
| 11,467,103 | B2 * | 10/2022 | Soejima | G01N 23/2209 |
| 11,796,485 | B2 * | 10/2023 | Hoghoj | G01N 23/20008 |
| 11,835,474 | B2 * | 12/2023 | Joensen | G01N 23/041 |
| 2004/0190681 | A1 * | 9/2004 | Omote | G01N 23/20 378/71 |
| 2017/0096511 | A1 * | 4/2017 | Atienza | C08F 4/64189 |
| 2017/0176356 | A1 * | 6/2017 | Hoffman | G01N 23/207 |
| 2019/0170669 | A1 * | 6/2019 | Hoghoj | G01N 23/20 |
| 2020/0400592 | A1 | 12/2020 | Gehrlein | |
| 2021/0364454 | A1 * | 11/2021 | Hoghoj | G01N 23/201 |
| 2022/0003691 | A1 * | 1/2022 | Soejima | G01N 23/223 |
| 2022/0297078 | A1 * | 9/2022 | Pozzo | B01J 19/10 |
| 2022/0326166 | A1 * | 10/2022 | Hoghoj | G21K 1/06 |
| 2023/0012833 | A1 * | 1/2023 | Joensen | G01N 23/201 |
| 2024/0248050 | A1 * | 7/2024 | Hoghoj | G01N 23/201 |

OTHER PUBLICATIONS

International Application Status Report generated Oct. 31, 2023.

Brian R Pauw, et al.; "Extending SAXS instrument ranges through addition of a portable, inexpensive USAXS module"; arxiv.org, Cornell University Library, 201 Olin Library Cornell University Ithaca, NY, Mar. 29, 2019.

Bolze Joerg, et al.; "Highly versatile laboratory X-ray scattering instrument enabling (nano-)material structure analysis on multiple length scales by covering a scattering vector range of almost five decades"; Review of Scientific Instruments, AIP, Melville, NY, Dec. 4, 2019; 90(12).

* cited by examiner 22
24
10
26
14
16
18
20
28 b
12
28 a
Y
11

22
24
10

26
14
16
18
32
20
14a
28 b
28 a
12
Y
11

24
10

14a
22
32
26
18
14
16
20
28 b
28 a
12
Y
11

22
Z
2Θ
16
18
28 b
28 a
Y
11

X-RAY SCATTERING APPARATUS AND X-RAY SCATTERING METHOD

The present invention relates to an X-ray scattering apparatus and an X-ray scattering method.

Material science and development requires structure characterization over large length scales to study the hierarchical structure impact on material function. Complex materials exhibit more or less structured entities depending on the length scale. Moreover the development of new materials requires in-situ characterization depending on external parameters, or in-operation structural characterization. Nano-structured materials with a structure typically in the length scale of 1 to 150 nm can be characterized with Small Angle X-ray Scattering (SAXS) at scattering angles ranging typically from 0.05° to 10° when two phases with sufficient electron density contrast are present in a sample by analyzing the intensity of the X-ray beam elastically scattered by the sample. The technique has been widely used for soft matter characterization, e.g. in the field of polymers, colloids or proteins in solutions.

New materials characterization requires a combination with Wide Angle X-ray Scattering (WAXS) to characterize crystalline structure, and most SAXS characterization instruments combine SAXS/WAXS and USAXS (Ultra-Small Angle X-ray Scattering) to probe structures from typically 1 Å to few microns, e.g. using a USAXS Bonse-Hart configuration to measure scattering profiles according to one direction only, i.e. adapted for isotropic samples.

In order to carry out SAXS, WAXS and USAXS measurements on the same sample and instrument, an X-ray scattering apparatus, comprising:

- a sample vacuum chamber;
- a sample holder placed inside the sample vacuum chamber for aligning and/or orienting a sample to be analyzed by X-ray scattering;
- an X-ray beam delivery system comprising a 2D X-ray source and a 2D monochromator and being arranged upstream of the sample holder for generating and directing an X-ray beam along a beam path in a propagation direction (Y) towards the sample holder;
- an X-ray detector, placed inside a diffraction chamber connected to the sample vacuum chamber, wherein the X-ray detector is arranged downstream of the sample holder and is movable, in particular in a motorized way, along the propagation direction such as to detect the X-ray beam and X-rays scattered at different scattering angles from the sample;
- wherein the X-ray beam delivery system is configured to focus the X-ray beam onto a focal spot on or near the X-ray detector when placed at its distal position having the largest distance from the sample holder or to produce a parallel beam,
- a Bonse Hart monochromator module positioned upstream of the sample holder and being equipped with a motorized monochromator holder;
- a Bonse Hart analyzer module positioned downstream of the sample holder and being equipped with a motorized analyzer holder;

wherein both the motorized monochromator holder and the motorized analyzer holder are configured such as to simultaneously position their respective modules in an active position in the X-ray beam for USAXS measurements and in an inactive position out of the X-ray beam for SAXS measurements, is commercially available from the applicant under the name "Xeuss 3.0".

The X-ray beam delivery system of this conventional X-ray scattering apparatus comprises a 2D X-ray source, for example a source with Cu or Mo anode for generating X-rays, and an optics and collimation system including a 2D monochromator, typically a multilayer monochromator for directing and conditioning the generated X-ray beam along the essentially horizontal propagation direction towards the sample holder which may comprise a motorized translation and/or rotation stage and other typical sample stage devices known in the field of X-ray scattering. The sample holder is positioned inside the sample vacuum chamber.

This conventional X-ray scattering apparatus comprises at least one X-ray detector which is arranged downstream of the sample holder, i.e. on a side of the sample holder opposite to the side of the X-ray beam delivery system:

The X-ray detector is normally mounted on a detector stage which allows for translation along the propagation direction of the direct beam, i.e. the part of the X-ray beam which is transmitted through the sample essentially without change of propagation direction, over large horizontal distances from the sample holder, typically in a range between 50 mm and 1000 mm or larger, e.g. up to 5000 mm. Depending on the positional details of the X-ray detector and the size of its sensor, it is typically able to detect X-rays scattered from the sample at scattering angles with respect to the direct X-ray beam as small as approximately $2\theta=0.05°$ and as large as 60° to 70°. The X-ray detector is thus suitable for Small Angle X-ray Scattering (SAXS) providing information on the sample structure at the nano-scale level and Wide Angle X-ray Scattering (WAXS) providing information on sample crystalline structure, i.e. structure at the resolution of atomic positions.

The X-ray beam delivery system, in particular the X-ray source and its associated X-ray optics, as well as the X-ray detector are of the 2D type, i.e. so that isotropic or anisotropic samples can be analyzed.

When a sample with a broad range of characteristic length scales from a few microns to a few nanometers has to be analyzed, X-ray scattering instruments like the Xeuss 3.0 use a sequential acquisition process with a first measuring sequence that comprises measuring one or several 2D SAXS scattering pattern, i.e. with one or several distal detector positions, followed or preceded by scanning USAXS measurements using the Bonse Hart modules. In the 2D SAXS pattern measurements the X-ray beam is used to illuminate the sample and its scattering pattern is collected and then analyzed using the X-ray detector. The scanning USAXS measurement requires positioning the Bonse Hart modules in their respective active positions by inserting the Bonse Hart monochromator module in the incident beam and the Bonse Hart analyzer module in the direct X-ray beam transmitted through the sample.

Normally the direct X-ray beam transmitted through the sample is merged with signal scattered by the sample at very low angles. During a scanning USAXS measurement, by rotating the Bonse Hart analyzer module along its diffraction plane, only a limited portion of X-ray signal is collected in the X-ray detector which allows to reconstruct a high resolution scattering curve because of small angular acceptance of the Bonse Hart analyzer module and the high resolution angular step used for its rotation. To achieve an increased resolution of the scattering curve compared to 2D SAXS measurements, Bonse Hart analyzer and Bonse Hart monochromator are typically made of single crystal monochromators like Silicon or Germanium crystals arranged in a multi-reflection configuration, in a so-called channel cut configuration in a dispersive or anti-dispersive configuration providing much reduced angular acceptance compared to 2D multilayer monochromators.

This so-called 1D USAXS scanning measurement allows to collect the scattered intensity from wave vectors of 0.0001 $Å^{-1}$ to 0.005 or 0.01 $Å^{-1}$ typically using radiation sources with copper anodes corresponding to characteristic length scales of few microns to few tens of nanometers, whereas the transmission 2D SAXS measurement allows to collect the scattered intensity from wave vectors of 0.0015 $Å^{-1}$ to 0.6 $Å^{-1}$ and up to 1 or 2 $Å^{-1}$ if a second position of the detector is used in a so-called MAXS (Middle-Angle X-ray Scattering) measuring position. MAXS characterization range is generally referred as being part of SAXS characterization range as it concerns scattering angles ranging typically from 1-2° to 10°.

One of the limitations of existing Bonse Hart set-ups in small angle X-ray instruments like the Xeuss 3.0 with a moving X-ray detector is that the Bonse Hart analyzer module does not allow to position the X-ray detector at the shortest sample to detector distance to perform WAXS experiments which might be necessary to characterize the crystalline phases of materials. Such measurements require to manually remove the Bonse Hart analyzer module from the vacuum chamber or to move it in a different place inside the vacuum chamber. The first-mentioned solution will limit the throughput of experiments by preventing to perform remote or fully computerized control data acquisition, while the second-mentioned method is not advantageous in terms of flexibility of scientific experiments that could be carried out with the apparatus as in general users prefer to keep a large free space around sample, e.g. for in-situ experiments which may require to place large sample environments like temperature, tensile, or shear stages. In that case parking the Bonse Hart analyzer module may not be possible anyway.

Furthermore, in some cases like with hierarchical materials having large aggregates or agglomerates together with large particles and much smaller particles, it is advantageous to couple USAXS and/or SAXS with 2D transmission measurements performed with the X-ray detector placed very close to the sample holder. It could be advantageous for data treatment for example for particle size distribution analysis of moderate size (few nanometers) to get a good signal extrapolation at large wave vectors where intensity is generally low, by measuring with a larger surface of detector this portion of the curve, which could improve or facilitate fit convergence. However, this will also require a removal of the Bonse Hart analyzer module so that this additional measuring step is often not performed in practice.

It is therefore an object of the invention to propose an X-ray scattering apparatus of the above type wherein scattering experiments can be performed continuously from the USAXS to the WAXS measuring regime to collect scattering wave vectors from Q=0.00012 $Å^{-1}$ to Q>20 $Å^{-1}$ using copper radiation sources.

According to the invention this object is achieved by an X-ray scattering apparatus of the above type, which is characterized in that it furthermore comprises a storage chamber integral with or connected to the sample vacuum chamber and/or the diffraction chamber, and in that the motorized analyzer holder is furthermore configured to position the Bonse Hart analyzer module in a storage position in the storage chamber.

For WAXS measurements the Bonse Hart analyzer module can then be positioned in the storage chamber which allows to move the X-ray detector very close to the sample holder. For USAXS measurements the Bonse Hart analyzer module can be positioned in its active position in the X-ray beam. For SAXS measurements the Bonse Hart analyzer module can be positioned in its inactive position out of the X-ray beam while for MAXS experiments it could be positioned in the storage chamber to prevent any shadowing effect for anisotropic sample measurements. All these movements can be carried out by means of the motorized analyzer holder allowing for remote and fully computerized control of all experiments.

The inactive position and the storage position of the Bonse Hart analyzer module are different or identical. In the first case the motorized analyzer holder is configured to move the Bonse Hart analyzer module between three different positions, in the latter case between two different positions, namely the inactive storage position and the active position in the X-ray beam.

In a preferred embodiment of the X-ray scattering apparatus according to the invention the storage chamber is arranged below and integral with or connected to the sample vacuum chamber. This offers the advantage that the storage chamber is not an obstacle for users during experiments, in particular when changes are to be made at the X-ray scattering apparatus, in particular at the sample vacuum chamber.

In that case it is particularly preferable that the Bonse Hart analyzer module has a top cover that is flush with a bottom wall of the sample vacuum chamber in the storage position. This offers the advantage that it keeps a large free space with no obstacle for the X-ray detector in WAXS measuring positions to accommodate the detector casing or stages or its movements in the detection plane, i.e. the plane perpendicular to the X-ray beam propagation direction. Moreover it keeps a large free space for sample environments cable handing inside the chamber.

In all embodiments having the storage chamber arranged below the sample vacuum chamber the X-ray detector is preferably movable to a proximal position in which it has the smallest distance from the sample holder and in which it is arranged above the storage chamber. This proximal position of the X-ray detector, with the Bonse Hart analyzer module being "parked" in the storage chamber, is then particularly suitable for WAXS measurements.

Preferably the X-ray detector is movable between its proximal position and its distal position on rails arranged inside the sample vacuum chamber and the diffraction chamber, wherein the motorized analyzer holder is at least partly arranged between the rails. Such a movement on rails assures a reliable guidance of the X-ray detector at all positions. The arrangement of the motorized analyzer holder at least partly between the rails allows the rails to extend to a proximal position very close to the sample holder while simultaneously making sure that the Bonse Hart analyzer module can be retracted downward from its active position to its storage position, thereby passing between the rails.

In a preferred embodiment of the X-ray scattering apparatus according to the invention the motorized analyzer holder comprises a telescope mechanism. This allows a space-saving storage of the Bonse Hart analyzer module and its motorized analyzer holder inside the storage chamber. Furthermore it also allows to keep an inactive position of the analyzer module without having to put the complete analyzer module in the storage chamber.

Advantageously the X-ray scattering apparatus according to the invention furthermore comprises a scatterless collimator in-between the X-ray beam delivery system and the sample vacuum chamber comprising at least a 2D slit or aperture placed close to the sample vacuum chamber. Such a slit or aperture is also called a "guard slit" and may be positioned adjacent to the sample vacuum chamber.

In all embodiments of the X-ray scattering apparatus according to the invention it is preferred that the motorized analyzer holder and the motorized monochromator holder comprise separate motor drives for independent movement of the modules. This increases the number of possible experimental setups. For USAXS experiments normally both the Bonse Hart monochromator module and the Bonse Hart analyzer module are placed in their respective active position in the incident X-ray beam and the direct X-ray beam transmitted through the sample, respectively. For SAXS measurements both modules are normally placed in their respective inactive position out of these beams, wherein the inactive position of the Bonse Hart analyzer module can be identical to or different from its storage position, as explained above. Providing separate motor drives for independent movement of the modules allows a further experimental setup in which the Bonse Hart monochromator module is in the incident X-ray beam whereas the Bonse Hart analyzer module is moved out of the beam. This setup allows a hybrid mode SAXS measurement in which the incident beam is further conditioned, in particular collimated, by the Bonse Hart monochromator module thus achieving a particularly fine resolution.

Consequently, an X-ray scattering method according to the invention carried out using the X-ray scattering apparatus according to any of the above embodiments comprises the following steps:

- moving the Bonse Hart monochromator module and the Bonse Hart analyzer module into the X-ray beam respectively by means of the motorized monochromator holder and the motorized analyzer holder;
- performing a 1D USAXS scanning measurement;
- moving the Bonse Hart analyzer module in its storage position in the storage chamber and simultaneously moving the Bonse Hart monochromator module in an inactive position;
- performing a 2D SAXS measurement;
- moving the X-ray detector to an intermediate distance between the proximal position and the distal position to collect MAXS scattering patterns; and
- moving the X-ray detector to a proximal position located above the storage chamber to collect WAXS scattering patterns.

Another X-ray scattering method according to the invention carried out using the X-ray scattering apparatus according to the embodiment having separate motor drives comprises the following steps:

- moving the Bonse Hart monochromator module into the X-ray beam by means of the motorized monochromator holder;
- moving the Bonse Hart analyzer module out of the X-ray beam by means of the motorized analyzer holder; and
- measuring a 2D SAXS pattern of a sample mounted on the sample holder.

This method according to the invention allows to perform additional 2D transmission SAXS measurements with an improved resolution at scattering angles <0.5° to improve measurements of samples with ordered structures in the range of few tens of nanometers or hundreds of nanometers. This method according to the invention is particularly suitable for characterizing isotropic samples.

Preferred embodiments of the X-ray scattering apparatus and method according to the invention will be described in the following with reference to the attached drawings, in which:

FIG. 1*a* shows a schematic side view of a conventional X-ray scattering apparatus with a Bonse Hart monochromator module and Bonse Hart analyzer module both in their active positions for USAXS measurements;

FIG. 1*b* shows a schematic side view of an X-ray scattering apparatus as in FIG. 1*a* with both modules in their inactive positions for SAXS measurements;

Figure 1A:
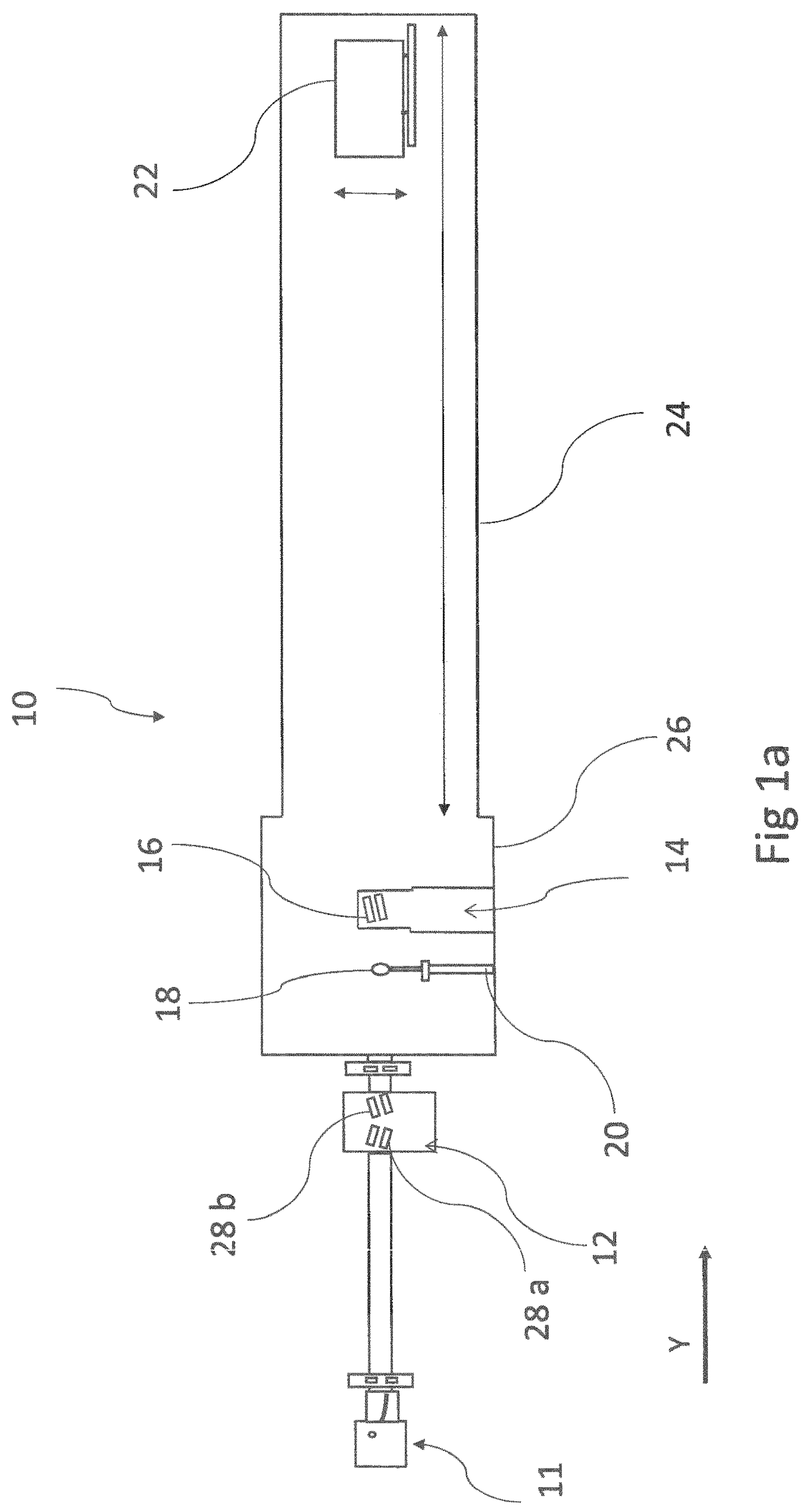
Figure 1B:
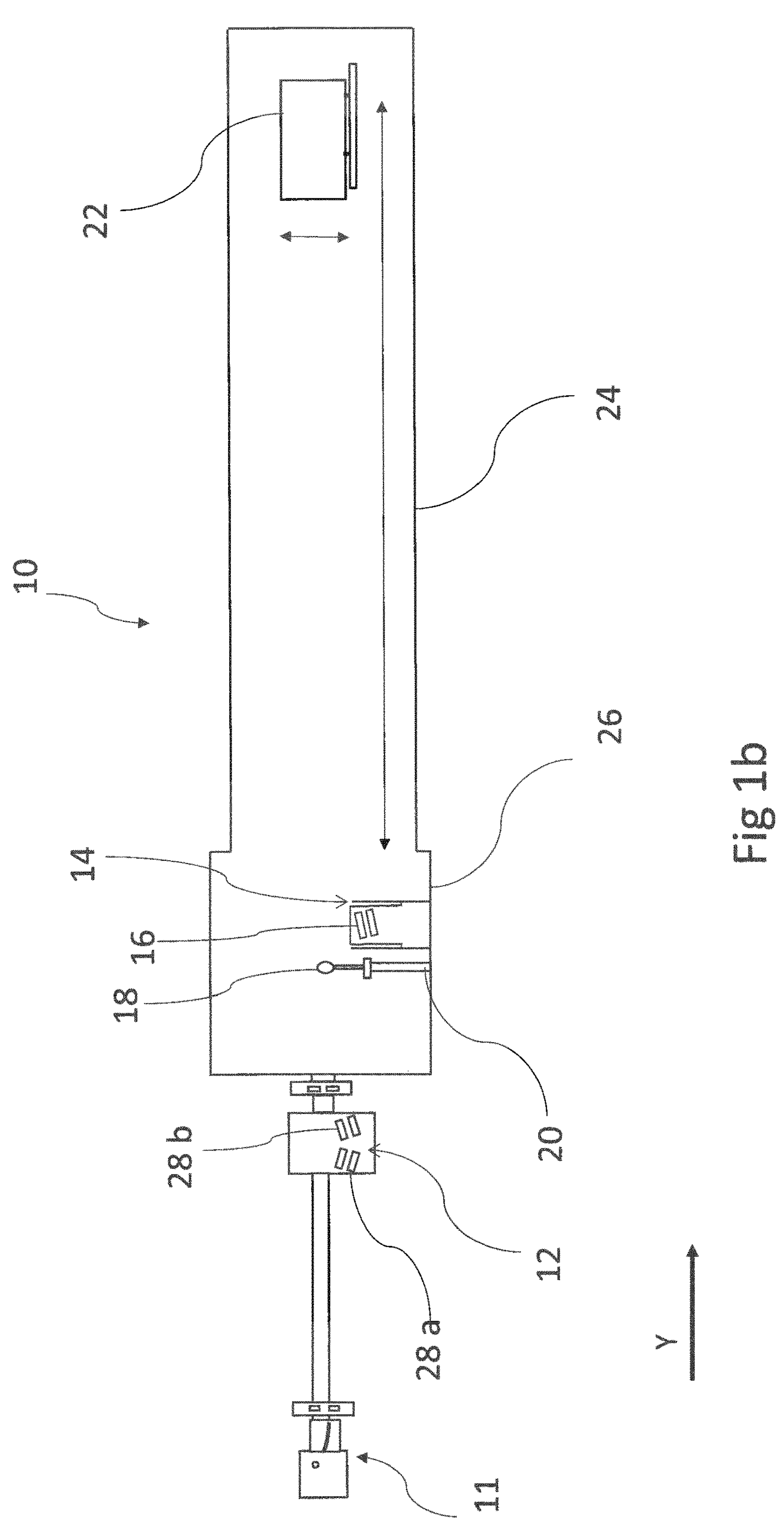

FIGS. 1*a* and 1*b* show a conventional X-ray scattering apparatus 10 with a Bonse Hart monochromator module 12 and a Bonse Hart analyzer module 14 in their active and inactive positions, respectively. The Bonse Hart analyzer module 14 contains a channel-cut crystal 16. The Bonse Hart analyzer module 14 including the channel-cut crystal 16 and all its alignment stages can be retracted so that the analyzer module 14 is placed in (FIG. 1*a*) and out (FIG. 1*b*) of a X-ray direct beam transmitted through a sample 18 mounted on a sample holder 20 in order to perform sequential USAXS and SAXS measurements. The X-ray beam comes from an X-ray beam delivery system 11 comprising a 2D X-ray source and a 2D monochromator and being arranged upstream of the sample holder 20 for generating and directing the X-ray beam along a beam path in a propagation direction Y towards the sample holder 20. The direction Y is indicated by an arrow in FIGS. 1*a,b*.

The X-ray scattering apparatus 10 furthermore comprises an X-ray detector 22 which is shown in its distal position in FIGS. 1*a* and 1*b* at the distal end of a diffraction chamber 24 connected to a sample vacuum chamber 26 in which the sample holder 20 is arranged.

In case of 1D USAXS transmission measurements the scattering signal detected on the X-ray detector 22 corresponds to a single scattering signal portion meeting the Bragg conditions of the analyzer channel-cut crystal 16. Subsequent rotation of the analyzer channel-cut crystal 16 allows to reconstruct the 1D USAXS scattering curve from the sample 18.

Since two channel-cut crystals 28 *a,b* of the Bonse Hart monochromator module 12 further collimate the X-ray beam coming out of the 2D monochromator of the X-ray beam delivery system 11 and reduce its spectral bandwidth, and since furthermore the Bonse Hart analyzer module 14 has a very narrow angular acceptance, much lower wave-vectors than with traditional 2D SAXS can be collected with the 1D scanning USAXS measuring channel.

Such a 1D USAXS scanning measurement is followed and/or preceded by transmission 2D SAXS measurements wherein the Bonse Hart monochromator module 12 and the Bonse Hart analyzer module 14 are put out of the incoming beam and transmitted direct beam, respectively.

Figure 5:
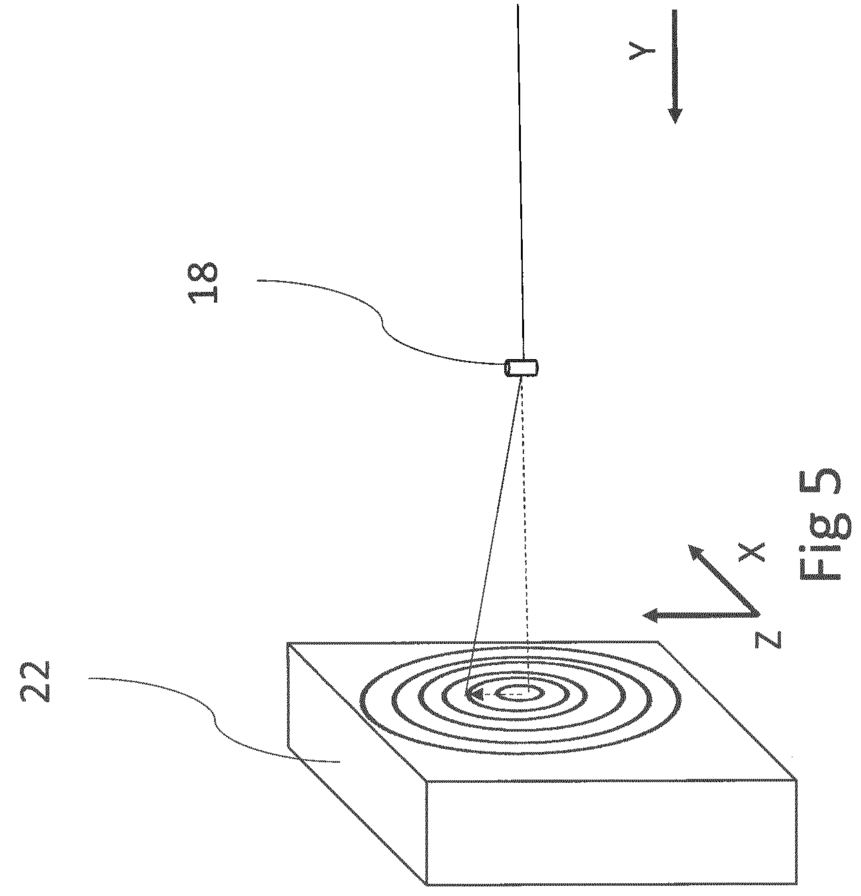
FIG. 5 shows a perspective side view of a scattering apparatus zoomed on the sample and on the X-ray detector showing the projection of the scattered X-ray beam onto the surface of the 2D detector of the said scattering apparatus.

In case of the transmission 2D SAXS measurement an analysis of the scattering intensity as a function of the scattering angle can be used by doing the proper pre-treatment analysis of the 2D scattered image collected on the X-ray detector 22. For isotropic samples an averaging of the scattered intensity along a detector area corresponding to a resolution step (which is generally defined by the pixel size) is performed for each scattered angle, as is schematically indicated in FIG. 5. For anisotropic samples, the scattering pattern detected on the X-ray detector 22 will not be symmetrical and only some azimuthal portions of the scattered pattern could be of interest to perform the signal integration.

As depicted in FIGS. 1*a* and 1*b* the presence of the Bonse Hart analyzer module 14 inside the sample vacuum chamber 26 conventionally prevents the X-ray detector 22 from being positioned at a very small sample to detector distance. Furthermore the Bonse Hart analyzer module 14 can generate a shadow for measurements where a large surface of detection has to be used including at longer sample to detector distances like in MAXS position, i.e. at distances from 30 to 50 cm. This could be the case for oriented samples (fibers, stretched sample, non-symmetrical nanoparticles like platelets aligned along a particular direction within a matrix). In that case one could use a very large detection surface or a so-called virtual detector surface where multiple X-ray data acquisition are taken by moving the X-ray detector 22 in its detection plane.

Figure 2:
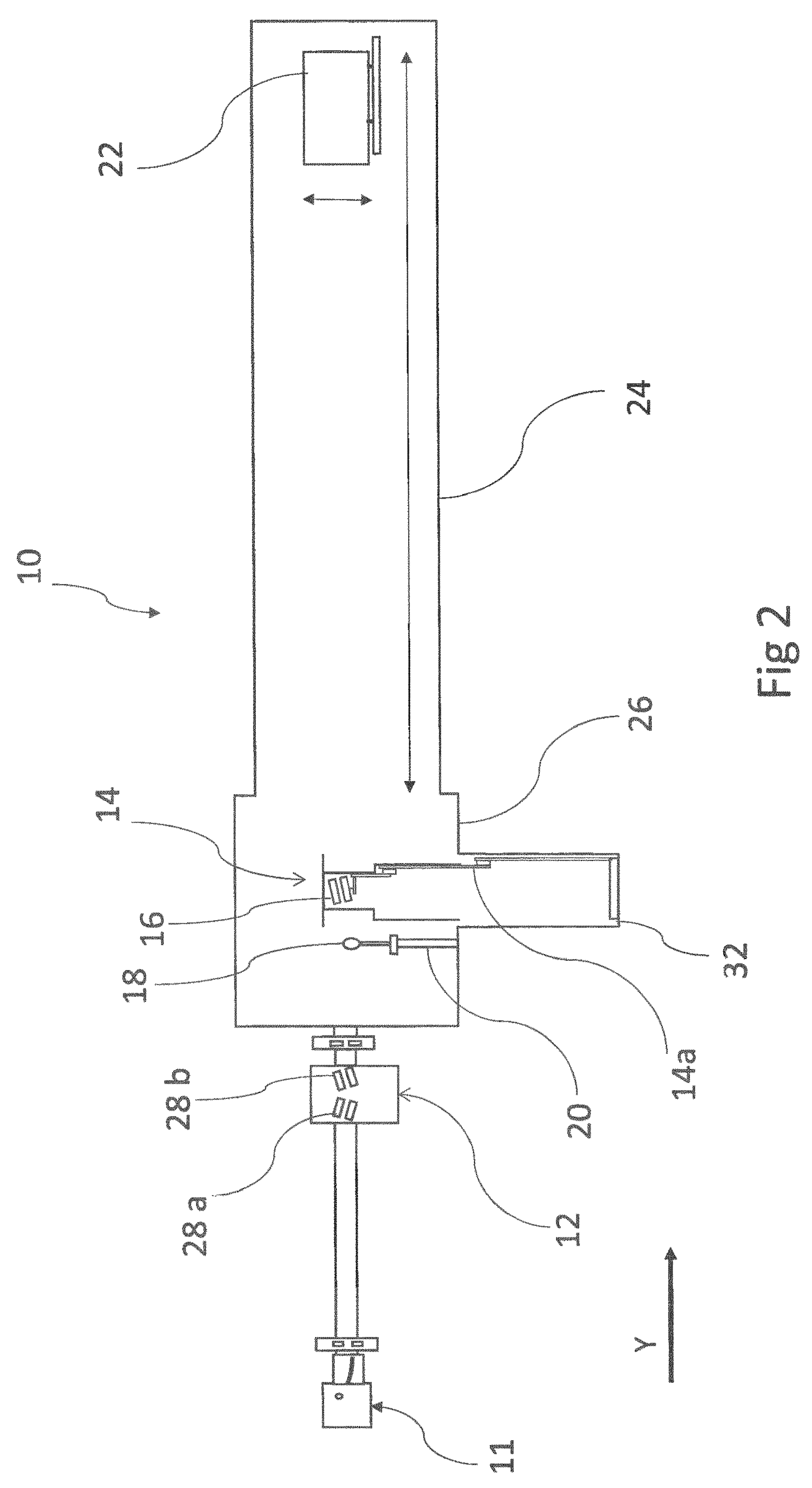
FIG. 2 shows a schematic side view of an X-ray scattering apparatus according to the invention wherein the Bonse Hart analyzer is in its measuring position.
Figure 3:
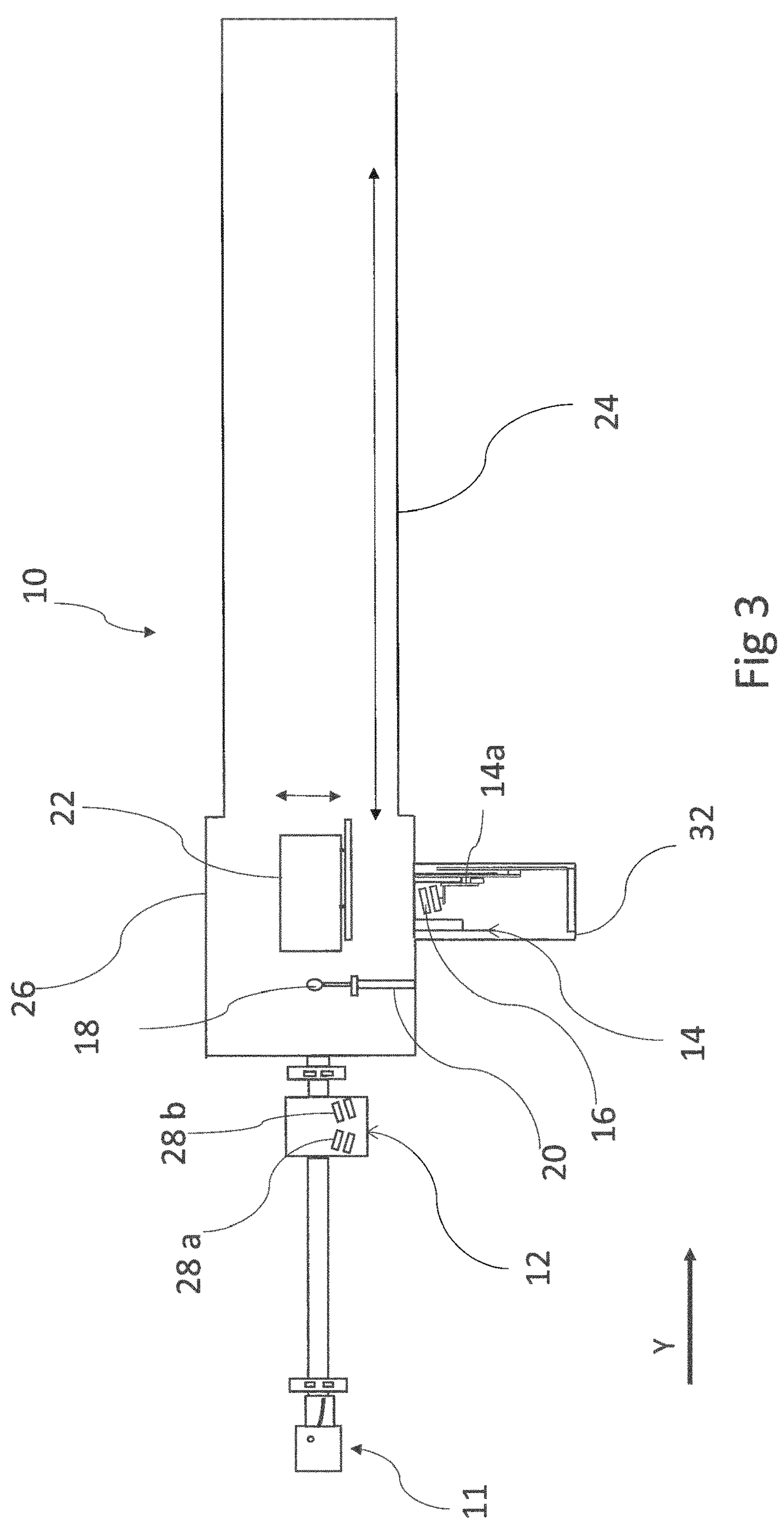
FIG. 3 shows a schematic side view of an X-ray scattering apparatus according to the invention wherein the Bonse Hart analyzer is in its storage position and the X-ray detector is in its WAXS measuring position.

FIGS. 2 and 3 show an X-ray scattering apparatus 10 according to the invention that comprises a storage chamber 32 that is integrally provided below the sample vacuum chamber 26. The Bonse Hart analyzer module 14 is equipped with a motorized analyzer holder 14*a* that is configured to position the Bonse Hart analyzer module 14 in a storage position in the storage chamber 32 as shown in FIG. 3.

Thus the channel-cut crystal 16 is located inside the Bonse Hart analyzer module 14 which can be lifted in and out of the sample vacuum chamber 26. In the active position shown in FIG. 2 the Bonse Hart analyzer module 14 is positioned "on top of a parking area", i.e. in a fully extended configuration so that a scanning USAXS measurement can be performed.

In FIG. 3 the complete Bonse Hart analyzer module 14 sits in its storage position in the storage chamber 32, i.e. in a parked position below the vacuum chamber 26 so that 2D WAXS experiments can be performed. As shown with such complete removal of analyzer module it is possible to further move the X-ray detector 22 closer to the sample 18 such as to be located above the storage chamber 32. With such position very close to the sample vacuum chamber 26, WAXS measurements can be performed up to large scattered angles. It is to be noted that with such a position of the analyzer module in its storage position it is also possible to position the X-ray detector in a MAXS measurement configuration without creating a shadow of the analyzer module on the X-ray detector 22. Of course all other measurements as described above in connection with FIGS. 1*a* and 1*b* are also possible with the X-ray scattering apparatus 10 according to the invention.

The Bonse Hart analyzer module 14 stays in the same evacuated environment as the sample vacuum chamber 26 to allow fast change of measurement configuration.

To limit the size of the storage chamber 32, the motorized analyzer holder 14*a* of the Bonse Hart analyzer module 14 comprises a telescope mechanism schematically indicated in FIG. 3.

As mentioned, all other measurements as described in connection with FIGS. 1*a* and 1*b* are also possible with the X-ray scattering apparatus 10 as shown in FIGS. 2 and 3.

In case of some samples with some well-defined structure in the range of few tens of nanometers or few hundred of nanometers, the resolution of the 2D SAXS measuring channel achieved with the X-ray beam delivery system 11 might be limited to properly detect the corresponding scattering patterns. The resolution is a convolution of the pixel resolution and the beam resolution. The beam resolution (given by the contribution of the beam size at the detector measuring position) is generally the biggest contribution. To reduce this value one might close the incident X-ray beam to very small dimensions, however by doing so extremely low intensities are achieved because the optical system, i.e. the monochromator part of the X-ray beam delivery system 11, needs to provide x-ray beams with high total flux for samples with low scattering intensities, like diluted samples, at moderate Qmin and also allow to achieve low Qmin capability with still sufficient intensity. To achieve this, the X-ray beam sizes used for transmission 2D scattering measurement is generally changed from 1 or 2 millimeters to 200 microns or less. Achieving smaller spot sizes is done at a very high cost of intensity.

Moreover performing a classical scanning USAXS measurement takes generally a longer time than performing a classical 2D X-ray scattering measurement.

The inventor has found that the X-ray beam as coming out of the X-ray beam delivery system 11 might be limited to achieve extreme resolution such as to characterize highly nanostructured systems at high dimensions (i.e. corresponding to low scattering angles).

Figure 4:
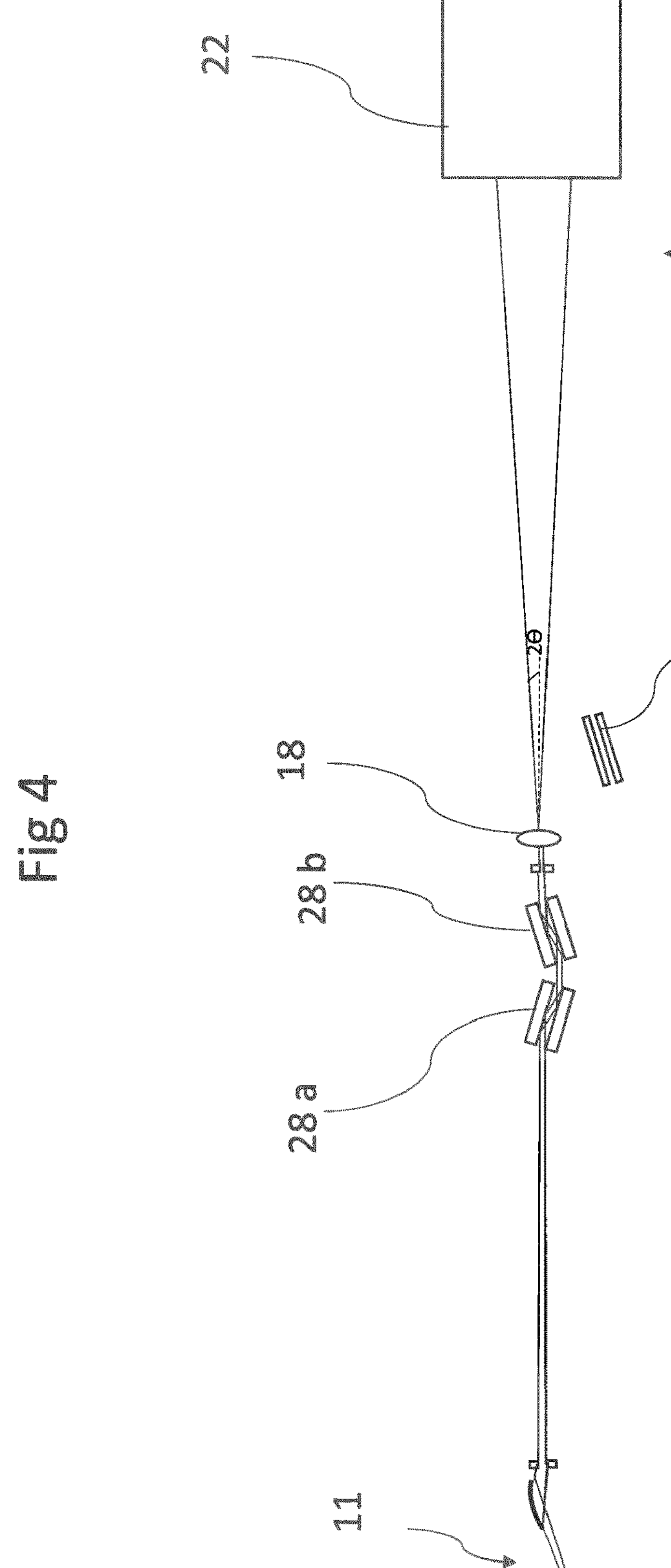
FIG. 4 shows a side view of a measuring configuration according to a preferred embodiment of the invention wherein the Bonse Hart analyzer is in an inactive position and a 2D SAXS measurement is performed by further collimating the X-ray beam coming out of the X-ray beam delivery system with the Bonse Hart crystal monochromator placed inside the incoming beam.

FIG. 4 is a schematic illustration of a scattering apparatus 10 according to the invention which enables to achieve this objective with the X-ray detector 22 in a distal position.

As shown, to achieve this the invention proposes performing a 2D scattering measurement wherein the X-ray beam generated by the X-ray beam delivery system 11 is further conditioned by placing the Bonse Hart monochromator module 12 inside the incoming beam in order to illuminate the sample 18 with a further collimated beam and performing a 2D scattering measurement. This is particularly advantageous when used for 2D SAXS measurements where the beam size will be the main resolution factor. To achieve this the X-ray scattering system 10 according to the invention includes a motorized analyzer holder 14*a* and a motorized monochromator holder that comprise separate motor drives for independent movement of the modules.

This set-up allows to acquire higher resolution 2D scattering experiments at an expense of flux but still with much shorter measuring times than scanning USAXS.

One could for example use such a measurement in complement to a classical measurement without the monochromator to ascertain the existence of features such as change of slopes, presences of form factor oscillations or scattering peaks at very low angles and decide if a scanning 1D USAXS measurement is necessary.

Such a measurement configuration leads to a smearing effect due to the asymmetric divergence of the beam which is wider in the plane perpendicular to the diffraction plane of the crystal monochromator of the Bonse Hart monochromator module 12. Indeed in the diffraction plane of the crystal monochromator (plane ZY as shown in FIG. 4) the divergence of the beam is controlled by the angular acceptance of the crystal monochromator while in the other direction the divergence will be larger because of a wider angular acceptance of the crystal monochromator.

In a preferred embodiment of the invention one might define an asymmetric beam size which will typically be defined by the guard slit (i.e. the second scatterless slit placed after the Bonse Hart monochromator module 12) which will increase the incident flux and the number of scatterers (exposed volume of the sample) to maximize the scattered intensity but will create a strong smearing effect. Typically the ratio of beam asymmetry could be in the range of a factor 5 to 20 (typically with the smaller dimension in the range of 100 to 200 microns) the bigger dimension being in the plane perpendicular to the monochromator diffraction plane, i.e. perpendicular to the plane of FIG. 4 (along X direction). In that case the smearing effect will come from the fact that scattered signal emitted from extreme positions of the sample will pollute detector pixels collecting different scattered angle coming from other points on the sample 18 (like the central part). This smearing effect is large at small angles but decreases for higher scattered angles.

In order to get a 1D curve with reduced impact of smearing effect but maximized signal to noise ratio, a scattering measuring method according to the invention will include a pre-treatment process wherein the measurement of the 2D SAXS pattern comprises a 2D to 1D data treatment comprising a prior selection of a region of interest 22*a* for signal integration taking into account the variation of the smearing effect on the scattered angle as a function of its value to keep a rather constant value of smearing effect on a large portion of the scattering curve.

Figure 6:
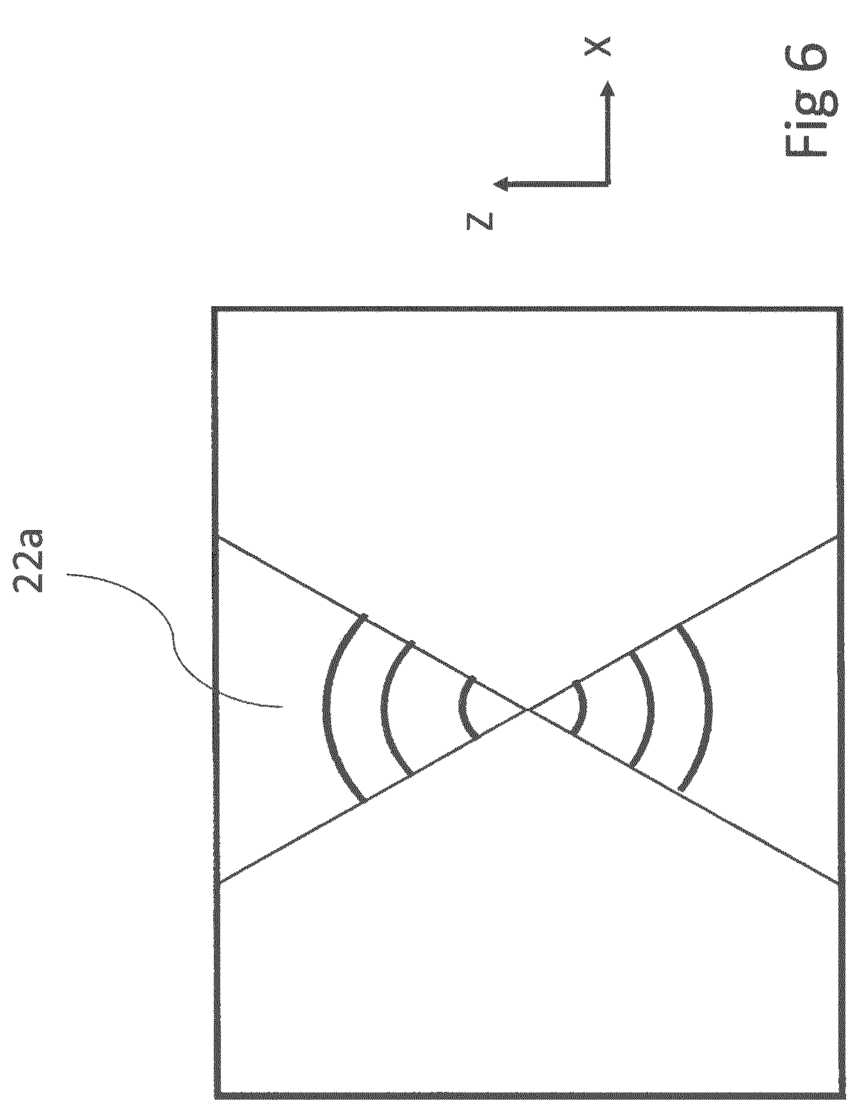
FIG. 6 shows an example of a virtual mask to define the region of interest for azimuthal averaging of the 2D scattered signal when using the measurement configuration according to the invention and as shown in FIG. 4.

In a preferred embodiment of the invention this region of interest for signal integration is in the form of two symmetrical cones with a common apex being the center of the X-ray direct beam position on the X-ray detector 22 as depicted in FIG. 6. This geometry is applied despite having samples with isotropic scattering.

The aperture of the cone angle will depend on the level of asymmetry of the incoming beam, i.e. on the size of the X-ray beam in the direction perpendicular to the scattering plane of the Bonse Hart crystal monochromator (along X direction). Typically for large beams in the range of 1 mm to 2 mm in this direction a cone angle in the range of 20° can be used (for each individual cone) to limit the effect of smearing at small angles, by limiting the number of pixels used for signal integration, while increasing the size of the region of interest 22*a* as a function of scattered angle in order to keep a large surface of detection in the parts away from the center of the detector where the center of the direct X-ray beam is generally positioned. By doing so, smearing effect is limited over large portion range of the scattering curve, and large surface of detection is maintained for large scattered angles to maximize signal to noise ratio in a portion of the scattering curve where scattered intensities are generally of low intensity.

In another embodiment of the scattering method according to the invention, the 2D to 1D data treatment includes a screening step in order to evaluate the impact of different cone angles on the generated 1D scattering curve profile, where the screening step includes a comparison of the evolution of the smallest detectable scattering feature and signal to noise ratio at large angles for the different cone angles in order to select the optimum cone angle where the position of the scattering feature is not evolving while maintaining high signal to noise ratio at large scattered angles.

The example shown on FIG. 6 is an approximated shape of the optimum region of interest. In a preferred embodiment of the invention this shape could be any shape other than rectangular or square shape and calculated to limit the impact of smearing effect on the resolution of the measurement so that its impact is limited compared to the resolution required to measure the smallest detectable feature in the scattering curve. The resolution required could be one tenth of the value in wavevector of the smallest detectable feature typically. It is to be noted however that for the first pixels corresponding to the first points of the scattering curve the smearing effect could still be important and in this case the region of interest is limited to a single pixel as it could be the case also for the double cone region of interest shown on FIG. 6.

In another embodiment of the invention wherein a 2D scattering measurement is performed using the Bonse Hart monochromator module 12 to further condition the X-ray beam incoming on the sample, a 2D desmearing method could be performed to obtain a 2D scattering pattern free of any instrumental resolution contribution in particular in the direction perpendicular to the diffraction plane of the Bonse Hart crystal monochromator.

In another embodiment of the invention wherein a 2D scattering measurement is performed using the Bonse Hart monochromator module 12 to further condition the X-ray beam incoming on the sample, the data acquisition is divided in several steps of equivalent measuring time wherein the acquisition steps are separated by a slight detector translation along the Bonse Hart monochromator module diffraction plane (i.e. along the vertical direction Z) using a translation range smaller than the detector pixel size. By knowledge of the translation step and application of image fusion algorithm methods, a final 2D scattering data with increased pixel resolution along this detector scanning direction is obtained. For example, by acquiring two images separated by a detector translation of half of the pixel size, the final 2D image will have a pixel size resolution improved by a factor of 2. Application of this known method is particularly advantageous along one direction which is part of the diffraction plane of the Bonse Hart monochromator module 12 where the beam resolution is improved by the proposed acquisition method and then limited by the detector pixel size. This enables to improve the combined pixel and beam resolution of the scattering data for the proposed 2D scattering method. Alternatively, if an improved pixel resolution in 2D is sought for example by a factor of two, the acquisition step is divided in 4 steps separated by a detector translation of half the pixel size in each of the 2D directions (i.e. along X and Z direction).

The invention claimed is:

1. An X-ray scattering apparatus (10), comprising:

a sample vacuum chamber (26);

a sample holder (20) placed inside the sample vacuum chamber (26) for aligning and/or orienting a sample (18) to be analyzed by X-ray scattering;

an X-ray beam delivery system (11) comprising a 2D X-ray source and a 2D monochromator and being arranged upstream of the sample holder (20) for generating and directing an X-ray beam along a beam path in a propagation direction (Y) towards the sample holder (20);

an X-ray detector (22), placed inside a diffraction chamber connected to the sample vacuum chamber (26), wherein the X-ray detector (22) is arranged downstream of the sample holder (20) and is movable along the propagation direction such as to detect the X-ray beam and X-rays scattered at different scattering angles from the sample (18), wherein the X-ray beam delivery system (11) is configured to focus the X-ray beam onto a focal spot on or near the X-ray detector (22) when the X-ray detector (22) is placed at a distal position having the largest distance from the sample holder (20) or to produce a parallel beam;

a Bonse Hart monochromator module (12) positioned upstream of the sample holder (20) and being equipped with a motorized monochromator holder;

a Bonse Hart analyzer module (14) positioned downstream of the sample holder (20) and being equipped with a motorized analyzer holder (14*a*), wherein both the motorized monochromator holder and the motorized analyzer holder (14*a*) are configured such as to simultaneously position their respective modules (12, 14) in an active position in the X-ray beam for USAXS measurements and in an inactive position out of the X-ray beam for SAXS measurements;

a storage chamber (32) integral with or connected to the sample vacuum chamber (26) and/or the diffraction chamber, and wherein the motorized analyzer holder (14*a*) is furthermore configured to position the Bonse Hart analyzer module (14) in a storage position in the storage chamber (32).

2. The X-ray scattering apparatus (10) according to claim 1, wherein the inactive position and the storage position of the Bonse Hart analyzer module (14) are different.

3. The X-ray scattering apparatus (10) according to claim 1, wherein the storage chamber (32) is arranged below and integral with or connected to the sample vacuum chamber (26).

4. The X-ray scattering apparatus (10) according to claim 3, wherein the Bonse Hart analyzer module (14) has a top cover that is flush with a bottom wall of the sample vacuum chamber (26) in the storage position.

5. The X-ray scattering apparatus (10) according to claim 3, wherein the X-ray detector (22) is movable to a proximal position, the proximal position being the smallest distance from the sample holder (20) and above the storage chamber (32).

6. The X-ray scattering apparatus (10) according to claim 5, wherein the X-ray detector (22) is movable between the proximal position and the distal position on rails arranged inside the sample vacuum chamber (26) and the diffraction chamber, wherein the motorized analyzer holder (14*a*) is at least partly arranged between the rails.

7. The X-ray scattering apparatus (10) according to claim 1, wherein the motorized analyzer holder (14*a*) comprises a telescope mechanism.

8. The X-ray scattering apparatus (10) according to claim 1, further comprising a scatterless collimator in-between the X-ray beam delivery system (11) and the sample vacuum chamber (26) comprising at least a 2D slit or aperture placed close to the sample vacuum chamber (26).

9. The X-ray scattering apparatus (10) according to claim 1, wherein the motorized analyzer holder (14*a*) and the motorized monochromator holder comprise separate motor drives for independent movement of the modules.

10. An X-ray scattering method carried out using the X-ray scattering apparatus (10) according to claim 9, comprising the following steps:

moving the Bonse Hart monochromator module (12) into the X-ray beam by means of the motorized monochromator holder;

moving the Bonse Hart analyzer module (14) out of the X-ray beam by means of the motorized analyzer holder (14*a*); and measuring a 2D SAXS pattern of a sample (18) mounted on the sample holder.

11. An X-ray scattering method according to claim 10, wherein the step of measuring the 2D SAXS pattern comprises a 2D to 1D data treatment comprising a prior selection of a region of interest for signal integration taking into account the variation of a smearing effect on the scattering angle as a function of a value to keep an essentially constant value of smearing effect on a large portion of a scattering curve.

12. An X-ray scattering method according to claim 10, wherein the step of measuring the 2D SAXS pattern comprises a 2D to 1 D data treatment comprising a prior selection of a region of interest for signal integration in the form of two symmetrical cones with a common apex being the center of the X-ray direct beam position on the X-ray detector (22).

13. An X-ray scattering method according to claim 10, wherein the step of measuring the 2D SAXS pattern is performed with an asymmetric 2D beam on the sample (18) as defined by a scatterless slit or aperture placed close to the sample chamber.

14. An X-ray scattering method carried out using the X-ray scattering apparatus (10) according to claim 1, comprising the following steps:

moving the Bonse Hart monochromator module (12) and the Bonse Hart analyzer module (14) into the X-ray beam respectively by means of the motorized monochromator holder and the motorized analyzer holder (14*a*);

performing a 1D USAXS scanning measurement;

moving the Bonse Hart analyzer module (14) in a storage position in the storage chamber (32) and simultaneously moving the Bonse Hart monochromator module in an inactive position;

performing a 2D SAXS measurement;

moving the X-ray detector (22) to an intermediate distance between the proximal position and the distal position to collect MAXS scattering patterns; and moving the X-ray detector (22) to a proximal position located above the storage chamber (32) to collect WAXS scattering patterns.

15. An X-ray scattering method carried out using an X-ray scattering apparatus (10) that comprises:

a sample vacuum chamber (26);

a sample holder (20) placed inside the sample vacuum chamber (26) for aligning and/or orienting a sample (18) to be analyzed by X-ray scattering;

an X-ray beam delivery system (11) comprising a 2D X-ray source and a 2D monochromator and being arranged upstream of the sample holder (20) for generating and directing an X-ray beam along a beam path in a propagation direction (Y) towards the sample holder (20);

an X-ray detector (22), placed inside a diffraction chamber connected to the sample vacuum chamber (26), wherein the X-ray detector (22) is arranged downstream of the sample holder (20) and is movable along the propagation direction such as to detect the X-ray beam and X-rays scattered at different scattering angles from the sample (18), wherein the X-ray beam delivery system (11) is configured to focus the X-ray beam onto a focal spot on or near the X-ray detector (22) when the X-ray detector (22) is placed at a distal position having the largest distance from the sample holder (20) or to produce a parallel beam;

a Bonse Hart monochromator module (12) positioned upstream of the sample holder (20) and being equipped with a motorized monochromator holder;

a Bonse Hart analyzer module (14) positioned downstream of the sample holder (20) and being equipped with a motorized analyzer holder (14*a*), wherein both the motorized monochromator holder and the motorized analyzer holder (14*a*) are configured to simultaneously position their respective modules (12, 14) in an active position in the X-ray beam for USAXS measurements and in an inactive position out of the X-ray beam for SAXS measurements, wherein the motorized analyzer holder (14*a*) and the motorized monochromator holder comprise separate motor drives for independent movement of the modules, wherein the X-ray scattering method comprises the following steps:

moving the Bonse Hart monochromator module (12) into the X-ray beam by means of the motorized monochromator holder;

moving the Bonse Hart analyzer module (14) out of the X-ray beam by means of the motorized analyzer holder (14*a*); and measuring a 2D SAXS pattern of a sample (18) mounted on the sample holder (20); and wherein the step of measuring the 2D SAXS pattern comprises a 2D to 1D data treatment comprising a prior selection of a region of interest for signal integration taking into account variation of a smearing effect with the scattering angle so as to keep the smearing effect essentially constant over a large portion of a scattering curve.

16. The X-ray scattering method according to claim 15, wherein the step of measuring the 2D SAXS pattern comprises a 2D to 1D data treatment comprising a prior selection of a region of interest for signal integration in the form of two symmetrical cones with a common apex being the center of the X-ray direct beam position on the X-ray detector (22).

17. The X-ray scattering method according to claim 15, wherein the step of measuring the 2D SAXS pattern is performed with an asymmetric 2D beam on the sample (18) as defined by a scatterless slit or aperture placed close to the sample chamber.

18. The X-ray scattering method according to claim 15, furthermore comprising the following steps:

moving the Bonse Hart monochromator module in an inactive position;

moving the X-ray detector (22) to an intermediate distance between the proximal position and the distal position to collect MAXS scattering patterns; and moving the X-ray detector (22) to a proximal position to collect WAXS scattering patterns.

19. The X-ray scattering method according to claim 15, furthermore comprising the following steps:

moving the Bonse Hart monochromator module (12) and the Bonse Hart analyzer module (14) into the X-ray beam respectively by means of the motorized monochromator holder and the motorized analyzer holder (14*a*); and performing a 1D USAXS scanning measurement.

* * * * *